United States Patent
Blanchard et al.

(10) Patent No.: US 7,272,759 B2
(45) Date of Patent: Sep. 18, 2007

(54) METHOD AND APPARATUS FOR SYSTEM MONITORING WITH REDUCED FUNCTION CORES

(75) Inventors: Anton Blanchard, Marrickville (AU); Milton Devon Miller, II, Austin, TX (US); Todd Alan Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 10/912,506

(22) Filed: Aug. 5, 2004

(65) Prior Publication Data

US 2006/0031721 A1     Feb. 9, 2006

(51) Int. Cl.
*G01R 31/28* (2006.01)
(52) U.S. Cl. .......................... 714/724; 714/47
(58) Field of Classification Search ............... 370/458, 370/395.7; 320/136; 702/63, 176; 711/144; 714/47, 30, 724; 713/1
See application file for complete search history.

(56) References Cited

U.S. PATENT DOCUMENTS

| | | | |
|---|---|---|---|
| 4,310,921 A * | 1/1982 | Rosa | 370/458 |
| 6,377,028 B1 * | 4/2002 | Armstrong et al. | 320/136 |
| 6,615,344 B1 * | 9/2003 | Hagen | 713/1 |
| 6,810,338 B2 * | 10/2004 | Mercke et al. | 702/63 |
| 7,012,924 B1 * | 3/2006 | Storck | 370/395.7 |
| 7,069,176 B2 * | 6/2006 | Swaine et al. | 702/176 |
| 7,080,283 B1 * | 7/2006 | Songer et al. | 714/30 |
| 7,093,081 B2 * | 8/2006 | DeWitt et al. | 711/144 |

* cited by examiner

*Primary Examiner*—David Ton
(74) *Attorney, Agent, or Firm*—Duke W. Yee; Diana R. Gerhardt; Gerald H. Glanzman

(57) ABSTRACT

A method, apparatus, and computer instructions for monitoring a device in a data processing system. A register associated with the device is accessed from a reduced function processor core through a connection between the register for the device and the reduced function processor core. The device is monitored using the value of the register.

20 Claims, 2 Drawing Sheets

METHOD AND APPARATUS FOR SYSTEM MONITORING WITH REDUCED FUNCTION CORES

BACKGROUND OF THE INVENTION

1. Technical Field

The present invention relates generally to an improved data processing system and in particular to a method and apparatus for processing data. Still more particularly, the present invention relates to a method, apparatus, and computer instructions for system monitoring.

2. Description of Related Art

In producing processor chips, chip makers gauge success based on yields as much as any other factor. A company that is able to execute and consistently deliver high yields will generally be able to meet customer demands. This situation is particularly true for cutting edge semiconductor fabrication processes in which chips command higher prices. With respect to yields, chips containing two or more processor cores may often be discarded because one of those cores do not meet the performance or testing parameters needed to identify the chip as a good chip. Testing of chips is performed for parametric faults and random defects. The manufacturing test is performed to see whether the manufactured chip meets the specifications for the particular type of processor.

These tests typically test every device on the chip. Tests that may be performed include functional and structural tests. A functional test tests the chip function in normal operation while a structural test specifically focuses on manufacturing defects that might cause the chip to behave differently from normal operations. Tests that may be performed on a core include, for example, a test pattern source and sync. The source generates test stimuli for the embedded core and the sync compares the response responses to the expected responses.

Some of the tests involve a burden or stress test. Such a process subjects a chip to high temperature and over voltage supply while running production tests. In attempting to increase the yield, one mechanism used is to steadily refine and optimize the process for manufacturing the chips. Another effort used in increasing yields is to identifying the optimal numbers of chips on a wafer.

Even with all the current processes and techniques for increasing wafer yields, a large number of chips are wasted or sold with fewer cores because one or more processor cores do not meet the specifications. Such a situation may occur with super-scaler processors, which often have multiple copies of execution units. If execution units are defective, the processor cores may still function, but not for the purpose of super-scaler processing. Therefore, it would be advantageous to have an improved method, apparatus, and computer instructions for reducing the number of chips that are discarded due to defects in a processor core.

SUMMARY OF THE INVENTION

The present invention provides a method, apparatus, and computer instructions for monitoring a device in a data processing system. A register associated with the device is accessed from a reduced function processor core through a connection between the register for the device and the reduced function processor core. The device is monitored using the value of the register.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
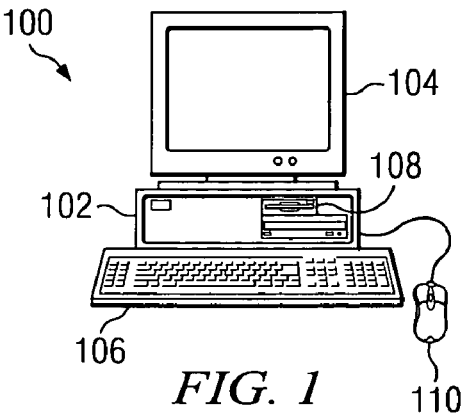
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
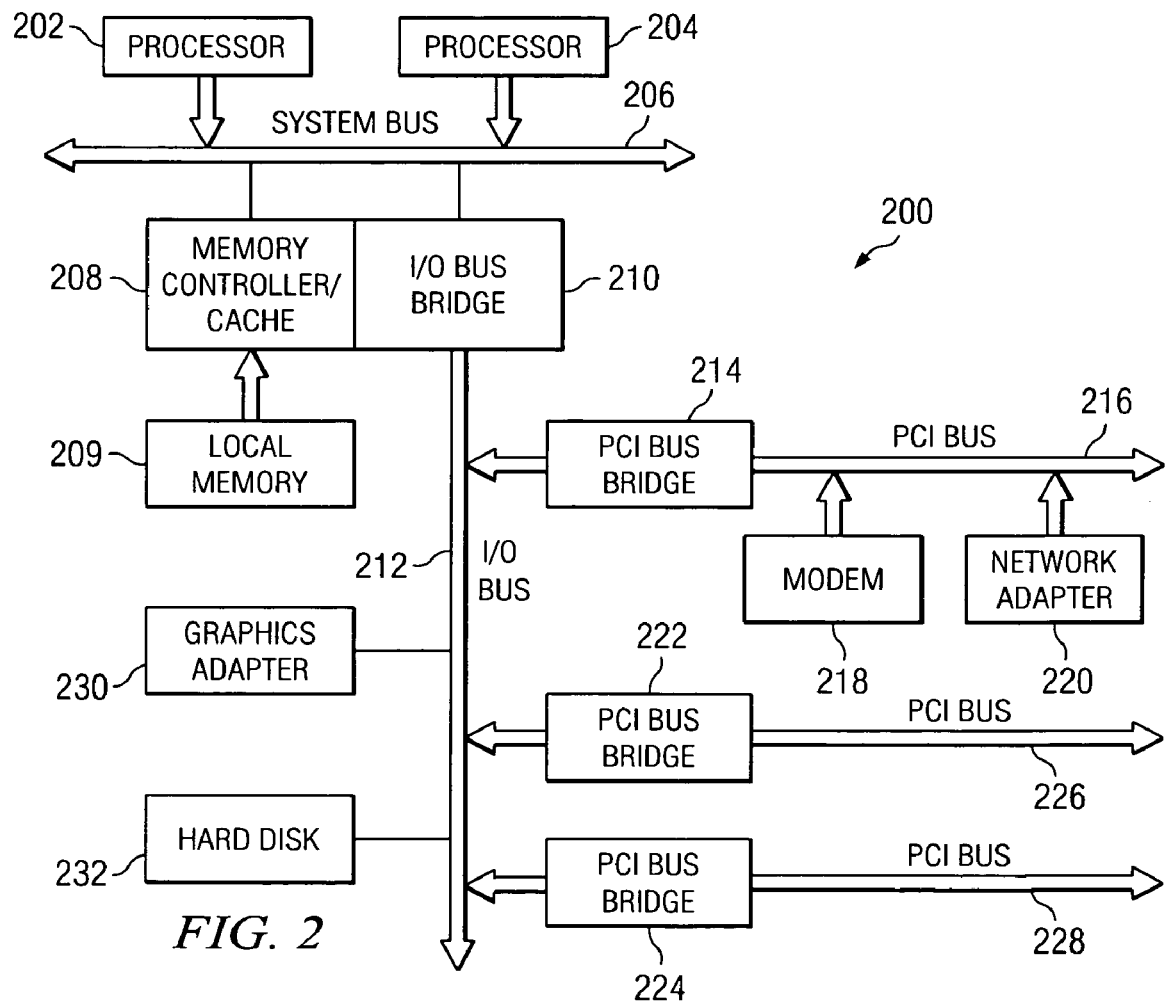
FIG. 2 is a block diagram of a data processing system that may be implemented as a server in accordance with a preferred embodiment of the present invention.

Referring to FIG. 2, a block diagram of a data processing system is depicted in accordance with a preferred embodiment of the present invention. Data processing system 200 is a block diagram of a data processing system such as computer 100 in FIG. 1. Data processing system 200 may be a symmetric multiprocessor (SMP) system including a plurality of processors 202 and 204 connected to system bus 206. Processor 202 and processor 204 may each contain one or more chips. Each chip may contain one or more processor cores. A process core is the part of a CPU chip without the cache memory. A processor core typically includes a control unit and an arithmetic logic unit. Alternatively, a single processor system may be employed.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to other systems may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eserver pseries system, a product of International Business Machines Corporation in Armonk, N.Y., running the Advanced Interactive Executive (AIX) operating system or LINUX operating system.

The present invention provides a method, apparatus, and computer instructions for monitoring devices, such as processor cores, using a processor core having reduced or limited functionality. A reduced function processor core is a processor core that is unable to be used for standard functional operations required of a processor core in a data processing system because it failed some manufacturing test.

A reduced function processor core may have such limited functionality that this processor core is only able to perform simple monitoring type tasks. A reduced function processor core is a processor core that is able to fetch and execute all monitoring code. The specific units required would vary greatly depending on the assigned monitoring tasks.

Frequently the monitoring code would not require super-scaler execution. Therefore, all but one of a given type of execution unit could be defective in a super-scaler processor core for the purpose of such a core being used as a reduced function core. Some units like floating point register files and execution units are only used by specific instructions, which could be avoided in most monitoring applications. In addition, all or some portion of the cache could be defective.

In the examples described below, monitoring a selected processor core is illustrated. An internal register within the selected processor core is accessed from another processor core. This other processor core has less functions that are operational or usable as compared to the selected processor core. The selected processor core is monitored by the other processor core using the value of the internal register.

The value of the internal register for example may represent the internal core temperature. The access to the internal register is facilitated through a bus connected to interfaces in the processor cores, such as a serial bus connecting the two processor cores. These types of interfaces are present in many currently available processor cores.

Figure 3:
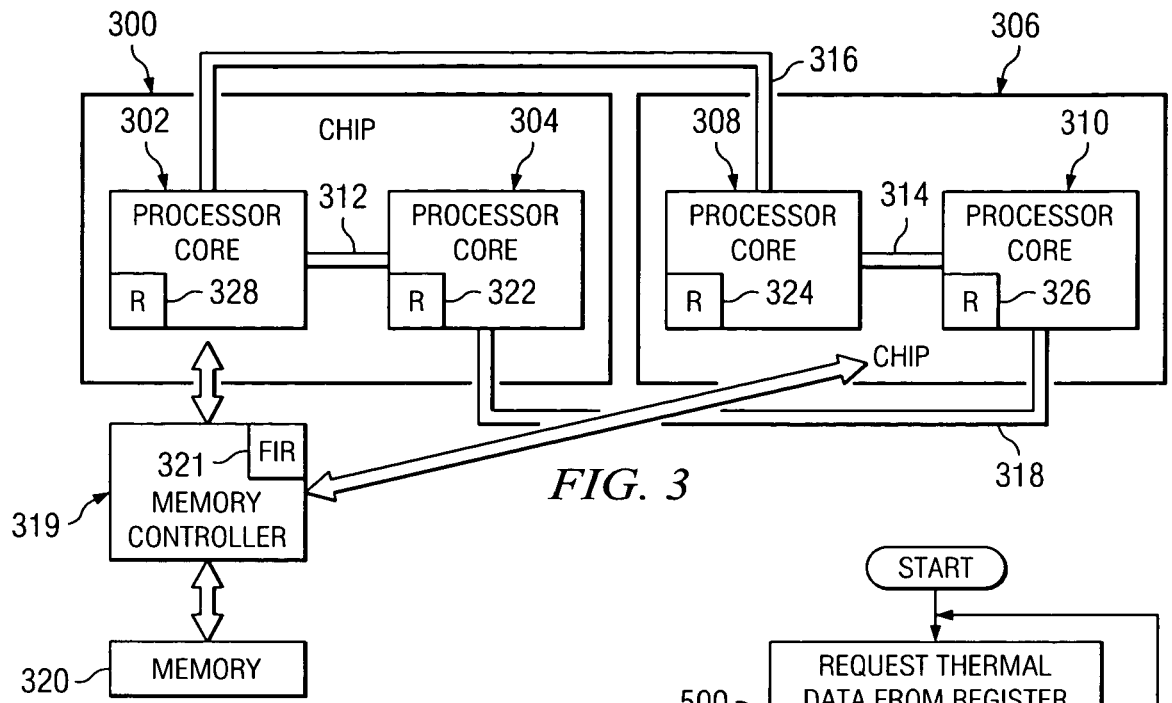
FIG. 3 is a diagram illustrating components in which system monitoring using reduced function cores may be implemented in accordance with a preferred embodiment of the present invention.

With reference next to FIG. 3, a diagram illustrating components in which system monitoring using reduced function processor cores may be implemented is depicted in accordance with a preferred embodiment of the present invention. In this illustrative example, chip 300 and chip 306 are examples of chips that may be found in processors, such as processor 204 and processor 202 in FIG. 2.

In the depicted example, chip 300 contains two processor cores, processor core 302 and processor core 304. Similarly, chip 306 also contains two processor cores, processor core 308, and processor core 310. The processor cores on these chips are connected to each other through serial buses, such as serial bus 312 and serial bus 314. The processor cores contain a serial bus interface, such as a Joint Test Action Group (JTAG) interface. Further, the processor cores in one chip may be interconnected to the processor cores in another chip. In this example, line 316 and line 318 interconnect the two chips. The lines or busses interconnecting the chips and the processor cores to each other are typically connected to a serial or serial like interface in the processor cores. These types of interfaces are typically narrow, slow, and inexpensive. The key requirement for the interconnections in the illustrative examples is an ability to address select the desired registers. Some suitable protocols for sending requests on these types of connections are JTAG and I$^2$C. I$^2$C is standard for a bi-directional two-wire serial bus that provides a communication link between integrated circuits.

In particular, processor core 302 is connected to processor core 308 through line 316 and processor core 304 is connected to processor core 310 through line 318. In this illustrative example, processor core 304 is a processor core with reduced functions. In other words, processor core 304 does not meet all of the parameters or performance standards required for the processor core to be used or sold as a processor core. In many cases, the cache for the processor core may contain too many defects. In other cases, some functional units in the processor core may be defective, preventing the processor core from providing all of the functions and performance necessary to be used.

In these illustrative examples, processor core 304 remains active even though some defects may be present. Processor core 304 is employed to monitor the other processor cores, such as processor core 302, processor core 308, and processor core 310. Processor core 304 accesses registers within processor core 302, processor core 308, and processor core 310 through the serial buses and lines that connect to serial interfaces in the processor cores. Specifically, processor core 304 accesses registers within the other processor cores to obtain data regarding those processor cores. These registers may include data regarding various operational parameters for the other processor cores. The data may include thermal data identifying the temperature for the different processor cores. Additionally, failure isolation registers (FIRs) may be accessed. These registers are used to isolate failure points in a chip or processor core or record soft-errors. Soft-errors are errors the hardware has already corrected. For example, with a memory controller FIR, a bit may be included to indicate that the memory controller has detected a correctable error (CE) as detected by error correcting code (ECC). In another register, the syndrome is logged to identify its origin.

In this example, memory controller 319 contains FIR registers 321 for this purpose. Memory controller 319 is connected to chip 300 and chip 306 to provide access to memory 320. Registers, such as FIR registers 321, in memory controller 319 may be accessed by processor core 304, for purposes of monitoring the controller in addition to monitoring other processor cores.

Processor core 304 may run a monitoring program that is stored in a memory, such as memory 320 in these examples.

Memory 320 may take various forms, such as system memory, cache, or a read only memory.

Any registers of interest may be accessed and monitored by processor core 304 through the serial buses and lines in these illustrative examples. Serial bus interfaces are commonly found in many processor cores. The processor core also includes an internal serial interface that provides addressability to these registers. This interface might be similar in function to I²C. The mechanism of the present invention takes advantage of these lines of communication to access information within the processor cores.

Further, the mechanism of the present invention allows for monitoring of other processor cores without requiring an external chip, such as a service processor. Monitoring by a service processor is slower and requires additional components. In these examples, a processor core that does not otherwise meet performance or functionality parameters may be used for monitoring. Additionally, fully functional processor cores also may be used for this purpose depending upon the particular implementation.

As a specific example, processor core 304 may monitor the temperature of processor cores 302, 308, and 310. Thermal sensors within these processor cores place data within registers in the processor cores. The registers are accessed by processor core 304 to identify the temperature of the processor cores. In this example, processor core 302 contains registers 328, processor core 308 contains registers 324, and processor core 310 contains registers 326. This information may be analyzed or stored within memory 320. Further, if the temperatures exceed a selected threshold, an alert may be generated. Processor core 304 also contains a register, such as register 322.

Figure 4:
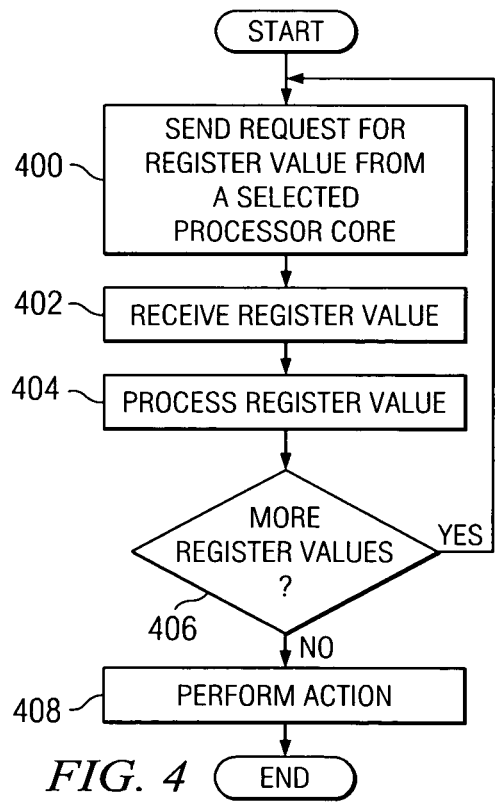
FIG. 4 is a flowchart of a process for accessing registers in a processor core in accordance with a preferred embodiment of the present invention.

Turning next to FIG. 4, a flowchart of a process for accessing registers in a processor core is depicted in accordance with a preferred embodiment of the present invention. The process illustrated in FIG. 4 may be implemented in a program stored in a memory, such as memory 320 and executed by a processor core, such as core 304 in FIG. 3.

The process begins by sending a request for a register value from a selected processor core (step 400). An example of a request is a series of writes and reads to a register whose contents controls and reports the state of a clock and data line. The series of reads and writes causes a command to be shifted onto the serial interface. This command intern causes the value in the register such as register 322 in FIG. 3 to be shifted out on to the data line where it can be read. Thereafter, a register value is received from the selected processor core (step 402). The register value is then processed (step 404). A determination is then made as to whether additional register values are present that need to be obtained for processing (step 406). If additional register values are present, the process returns to step 400.

Otherwise, an action is performed (step 408). This action may take various forms depending on the particular implementation. For example, the action may be to store the data retrieved from the registers in to memory 420. Another action that may be performed includes, for example, generating an alert if a register value exceeds a selected threshold. One example of generating an alert is if a value identifying the temperature of a processor core exceeds a threshold, then an alert is generated. The process terminates thereafter.

Figure 5:
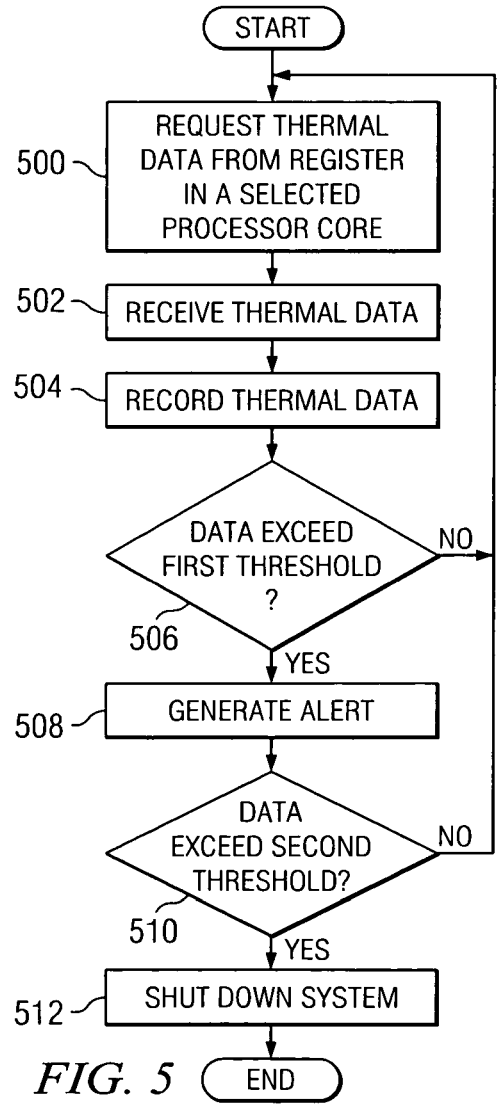
FIG. 5 is a flowchart of a process for handling thermal data in accordance with a preferred embodiment of the present invention.

Turning next to FIG. 5, a flowchart of a process for handling thermal data is depicted in accordance with a preferred embodiment of the present invention. The process in FIG. 5 is a more detailed example of the general process described in FIG. 4.

The process begins by requesting thermal data from a register in a selected processor core (step 500). Thereafter, the thermal data is received from the processor core (step 502). The thermal data is then recorded (step 504). This thermal data may be stored in a memory, such as memory 320 in FIG. 3. A determination is then made as to whether the thermal data retrieved from the processor core exceeds a first threshold (step 506). This first threshold is set to a particular value depending on the particular processor core and thresholds that are desired. In this illustrative embodiment, the value may be set to a level below which damage occurs to allow corrective actions to be taken earlier. In this example, the first threshold indicates that the processor core is becoming warm or has reached some temperature level at which action may need to be taken by the user or administrator to prevent further increases in the temperature of the processor core. Alternatively, the first threshold may be set to a value at which damage may occur to the processor core.

If the data does not exceed the first threshold, the process returns to step 500. Otherwise, an alert is generated (step 508) with the process terminating thereafter. This alert may take various forms. For example, the processor core, executing this process, may send a signal that initiates the sending of a pager call or e-mail message to a user, such as an administrator or support person. This alert also may be a simple interrupt to the operating system running on a fully functional processor core, depending on the capability of the processor core performing the monitoring. The processor core performing the monitoring may not be able to perform the entire action required, such as sending an email message.

Next, a determination is made as to whether the data exceeds a second threshold (step 510). The second threshold may be selected as one that indicates a dangerous level has been reached and that damage to the processor may occur. If the data does not exceed the second threshold the process returns to step 500. If the second threshold is exceeded, the system is shut down (step 512) with the process terminating thereafter. As part of this shut down, another alert may be generated.

Thus, the present invention provides an improved method, apparatus, and computer instructions for monitoring processors in a system using a core that has reduced functionality. This mechanism allows for cores that would otherwise be deactivated or unused to perform monitoring functions that would otherwise require another processor core or a separate service processor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The mechanism of the present invention is illustrated with respect to a processor core with limited functionality monitoring other processor cores. The monitoring may be for other devices than processor cores. For example, any device connected to the serial interface for a reduced function processor core may be monitored by that processor core. For example, devices such as I/O bridges, memory controllers, fans, and power supplies may be monitored by a reduced function processor core.

As another illustrative example, memory controller 319 may be monitored by processor core 304 through FIR 321. This type of monitoring is accomplished through providing a bus between memory controller 319 and processor core 304 such that processor core 304 is able to access FIR 321. In this manner, processor core 304 may monitor memory controller 319 for errors that occur in memory controller 319. As a result, this type of monitoring may be performed using a processor that has reduced or limited functions. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring a device in a data processing system, the method comprising:
    accessing a register associated with the device from a reduced function processor core that is unable to be used for standard functional operations required of a processor in a data processing system through a connection between the register for the device and the reduced function processor core; and
    monitoring data regarding an operational parameter of the device using the value of the register.

2. The method of claim 1, wherein the connection is a bus connected to a first serial interface in the device and a second serial interface in the reduced function processor core.

3. The method of claim 1, wherein a connection to the register is accessible via an address location on a system bus.

4. The method of claim 1, wherein the device is one of a processor core, a memory controller, an I/O bridge, a fan, or a power supply.

5. The method of claim 1, wherein the register is located within the device.

6. A method for monitoring a processor core, the method comprising:
    accessing an internal register within a first processor core from a second processor core through connection between the first processor core and the second processor core; and
    monitoring the first processor core using the value of the internal register.

7. The method of claim 6, wherein the second processor core is a reduced function processor core that is unable to be used for standard functional operations required of a processor in a data processing system.

8. The method of claim 6, wherein the first processor core is one of two processor cores on a chip.

9. The method of claim 6, wherein the value indicates a temperature of the first processor core.

10. The method of claim 6, wherein the connection between the first processor core and the second processor core is a serial bus connection.

11. A data processing system for monitoring a device in the data processing system, the data processing system comprising:
    accessing means for accessing a register associated with the device from a reduced function processor core that is unable to be used for standard functional operations required of a processor in a data processing system through a connection between the register for the device and the reduced function processor core; and
    monitoring means for monitoring data regarding an operational parameter of the device using the value of the register.

12. The data processing system of claim 11, wherein the connection is a bus connected to a first serial interface in the device and a second serial interface in the reduced function processor core.

13. The data processing system of claim 11, wherein a connection to the register is accessible via an address location on a system bus.

14. The data processing system of claim 11, wherein the device is one of a processor core, a memory controller, an I/O bridge, a fan, or a power supply.

15. The data processing system of claim 11, wherein the register is located within the device.

16. A computer program product in a computer readable medium for monitoring a device in a data processing system, the computer program product comprising:
    first instructions for accessing a register associated with the device from a reduced function processor core that is unable to be used for standard functional operations required of a processor in a data processing system through a connection between the register for the device and the reduced function processor core; and
    second instructions for monitoring data regarding an operational parameter of the device using the value of the register.

17. The computer program product of claim 16, wherein the connection is a bus connected to a first serial interface in the device and a second serial interface in the reduced function processor core.

18. The computer program product of claim 16, wherein a connection to the register is accessible via an address location on a system bus.

19. The computer program product of claim 16, wherein the device is one of a processor core, a memory controller, an I/O bridge, a fan, or a power supply.

20. The computer program product of claim 16, wherein the register is located within the device.

* * * * *